(12) United States Patent
Kang

(10) Patent No.: US 10,021,308 B2
(45) Date of Patent: Jul. 10, 2018

(54) DIGITAL IMAGING APPARATUS AND CONTROL METHOD

(71) Applicant: SAMSUNG ELECTRO-MECHANICS CO., LTD., Suwon-si (KR)

(72) Inventor: Shin Jae Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 124 days.

(21) Appl. No.: 15/086,893

(22) Filed: Mar. 31, 2016

(65) Prior Publication Data

US 2016/0316145 A1 Oct. 27, 2016

(30) Foreign Application Priority Data

Apr. 24, 2015 (KR) ........................ 10-2015-0058019

(51) Int. Cl.
*H04N 5/225* (2006.01)
*H04N 5/232* (2006.01)

(52) U.S. Cl.
CPC ..... *H04N 5/23287* (2013.01); *H04N 5/23258* (2013.01)

(58) Field of Classification Search
CPC ............. H04N 5/2328; H04N 5/23258; H04N 5/23251; G02B 27/646; G02B 27/64; G02B 27/644; G03B 2205/0007; G03B 2205/0023; G03B 2205/0038; G03B 2217/005

See application file for complete search history.

(56) References Cited

U.S. PATENT DOCUMENTS

| | | | |
|---|---|---|---|
| 7,211,042 B2 | 5/2007 | Chatenever et al. | |
| 2005/0018051 A1* | 1/2005 | Tomita | H04N 5/23248 348/208.4 |
| 2008/0136929 A1* | 6/2008 | Kim | H04N 9/045 348/222.1 |
| 2010/0013937 A1* | 1/2010 | Washisu | G03B 5/00 348/208.2 |
| 2010/0239237 A1 | 9/2010 | Lee et al. | |
| 2012/0033091 A1* | 2/2012 | Miyasako | H04N 5/23254 348/208.1 |
| 2013/0004151 A1* | 1/2013 | Wakamatsu | G02B 27/646 396/55 |

(Continued)

FOREIGN PATENT DOCUMENTS

| | | |
|---|---|---|
| JP | 2012-194506 A | 10/2012 |
| KR | 10-2010-0104383 A | 9/2010 |

*Primary Examiner* — Twyler L Haskins
*Assistant Examiner* — Dwight Alex C Tejano
(74) *Attorney, Agent, or Firm* — NSIP Law

(57) ABSTRACT

There is provided a digital imaging apparatus including a motion sensor configured to output motion data corresponding to a movement of a camera module from at least one sensing axis, a single signal conversion processor configured to transmit or receive the motion data at a switching timing interval, and to compensate for a phase delay due to the switching timing interval of the motion data, and a single signal conversion controller configured to control the switching timing interval of the single signal conversion processor and phase delay compensation regarding the motion data of the at least one sensing axis according to the switching timing interval.

18 Claims, 12 Drawing Sheets

(56) References Cited

U.S. PATENT DOCUMENTS

| | | | |
|---|---|---|---|
| 2013/0195434 A1* | 8/2013 | Sakurai | H04N 5/23261 396/55 |
| 2014/0184834 A1* | 7/2014 | Miyasako | H04N 5/23254 348/208.1 |
| 2015/0209599 A1* | 7/2015 | Schlosser | A61N 5/1049 600/427 |
| 2015/0316577 A1* | 11/2015 | Pakzad | G01P 13/02 702/150 |

* cited by examiner

DIGITAL IMAGING APPARATUS AND CONTROL METHOD

CROSS-REFERENCE TO RELATED APPLICATION

This application claims the benefit under 35 USC § 119(a) of Korean Patent Application No. 10-2015-0058019 filed on Apr. 24, 2015, with the Korean Intellectual Property Office, the entire disclosure of which is incorporated herein by reference for all purposes.

BACKGROUND

1. Field

The following description relates to a digital imaging apparatus and a control method.

2. Description of Related Art

In a digital imaging apparatus, an image is captured by an imaging device. The captured image is processed by a digital signal processor. The processed image is compressed to generate an image file and the image file may be stored in a memory.

The digital imaging apparatus may display an image of an image file captured by an image capturing device or an image of an image file stored in a storage medium, on a display device such as, for example a liquid crystal display (LCD). However, when a user captures an image, the digital imaging apparatus such as, for example, a camera or a phone, may move due to a hand-shake of a user. The movement of the digital imaging apparatus may lead to blurring of that image input through the image capturing device, resulting in the captured image not being clear.

In the related art, such as the patent document mentioned below, in order to try to capture clear images despite hand-shake, a process of correcting a captured image is performed. In one process, an angular velocity of a camera may be detected by a gyro sensor installed in the camera. When hand-shake occurs, a driving distance of a camera lens may be calculated on the basis of the detected angular velocity, and the lens may be moved by the driving distance by an actuator in an optical image stabilization (OIS) process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect there is provided a digital imaging apparatus including a motion sensor configured to output motion data corresponding to a movement of a camera module from at least one sensing axis, a single signal conversion processor configured to transmit or receive the motion data at a switching timing interval$\Delta t$, and to compensate for a phase delay due to the switching timing interval $\Delta t$ of the motion data, and a single signal conversion controller configured to control the switching timing interval $\Delta t$ of the single signal conversion processor and phase delay compensation regarding the motion data of the at least one sensing axis according to the switching timing interval $\Delta t$.

The single signal conversion controller may be further configured to calculate a delay timing to compensate for a phase delay due to the switching timing interval of motion data regarding another sensing axis in relation to a switching time of the motion data regarding the at least one sensing axis, and to transmit the calculated delay timing to the single signal conversion processor, and the single signal conversion processor may be further configured to compensate for a phase of the motion data regarding the another sensing axis such that the phase is equal to that of the motion data regarding the at least one sensing axis on the basis of the delay timing.

The single signal conversion processor may include a first analog signal processor configured to amplify the motion data regarding the at least one sensing axis with a preset gain, and to periodically transmit the motion data regarding each of the at least one sensing axis at the switching timing interval, an analog-to-digital converter (ADC) configured to convert the motion data transmitted from the first analog signal processor into a digital value, and a digital signal processor configured to restore the motion data regarding each of the at least one sensing axis on the basis of the digital value transmitted from the ADC, and to compensate for the phase delay due to the switching timing interval of the motion data.

The first analog signal processor may include at least one analog front end corresponding to the at least one sensing axis and the at least one analog front end being configured to amplify the motion data from the at least one sensing axis with a preset gain, and a first analog multiplexer may be configured to periodically transmit the motion data regarding the at least one sensing axis output from the corresponding at least one analog front end at the switching timing interval.

The digital signal processor may include a demultiplexer configured to restore the motion data regarding each of the at least one sensing axis at the switching timing interval on the basis of the digital value transmitted from the ADC, and at least one phase delay compensator configured to compensate for a phase delay due to the switching timing interval of the motion data regarding the another sensing axis in relation to the switching time of the motion data regarding the at least one sensing axis, the at least one phase delay compensator corresponding to the another sensing axis.

The digital imaging apparatus may include a phase delay compensator configured to compensate for a phase of motion data regarding another sensing axis such that it is equal to a phase of motion data regarding the at least one sensing axis on the basis of a delay timing transmitted from the single signal conversion controller.

The single signal conversion processor may include a second analog signal processor configured to receive the motion data regarding each of the at least one sensing axis at the switching timing interval, and to amplify the motion data with a preset gain, an analog-to-digital converter (ADC) configured to convert the motion data transmitted from the analog signal processor into a digital value, and a digital signal processor configured to restore the motion data regarding each of the at least one sensing axis on the basis of the digital value transmitted from the ADC, and to compensate for the phase delay due to the switching timing interval of the motion data.

The second analog signal processor may include a second analog multiplexer to which the motion data regarding each of the at least one sensing axis output from the motion sensor is alternately input at the switching interval, and a single analog front end amplifying the motion data regarding each of the at least one sensing axis transmitted from the second analog multiplexer with a preset gain.

The digital imaging apparatus may include a reference signal generator configured to generate a reference signal having the same phase and applying the reference signal to the single signal conversion processor.

The digital imaging apparatus may include a filter configured to filter noise of the motion data output from the single signal conversion processor.

A number of the analog front end may correspond to a number of sensing axis for the motion data output from the motion sensor.

In another general aspect there is provided a method for controlling a digital imaging apparatus, the method including outputting, by a motion sensor, motion data corresponding to a movement of a camera module from at least one sensing axis, compensating for, with a single signal conversion processor, a phase delay due to a time interval of the motion data alternately transmitted or received at a time interval between the at least one sensing axis, and controlling, by a single signal conversion controller, a switching timing interval of the single signal conversion processor and phase delay compensation of the motion data from the at least one sensing axis according to the switching timing interval.

The controlling of the switching timing interval may include calculating, by the single signal conversion controller, a delay timing for compensating for a phase delay according to the switching timing interval of motion data regarding another sensing axis in relation to a switching time of the motion data regarding the at least one sensing axis, and transmitting the delay timing to the single signal conversion processor, compensating, at the single signal conversion processor, for a phase of motion data regarding the another sensing axis such that the phase is equal to a phase of motion data regarding the at least one sensing axis on the basis of the delay timing.

The compensating for the phase delay may include amplifying, by a first analog signal processor, the motion data from the at least one sensing axis with a preset gain and periodically transmitting the motion data from the at least one sensing axis at a switching timing interval, converting, by an analog-to-digital converter (ADC), the motion data transmitted from the first analog signal processor into a digital value, and restoring, by a digital signal processor, the motion data regarding each of the at least one sensing axis on the basis of the digital value transmitted from the ADC, and compensating for a phase delay of the motion data due to the switching timing interval.

The amplifying of the motion data may include amplifying, by an analog front end corresponding to the at least one sensing axis, the motion data from the at least one sensing axis with a preset gain, and periodically transmitting, by a first analog multiplexer, the motion data from the at least one sensing axis output from each analog front end at the switching timing interval.

The restoring of the motion data may include restoring, by a demultiplexer, the motion data from the at least one sensing axis at the switching timing interval on the basis of the digital value transmitted from the ADC, and compensating for, by a phase delay compensator corresponding to the at least one sensing axis, a phase delay of motion data regarding another sensing axis according to the switching timing interval in relation to a switching time of the motion data regarding the at least one sensing axis.

The compensating for the phase of the motion data may include transmitting second motion data by alternately receiving, by a second analog signal processor, the motion data from the at least one sensing axis at a switching timing interval and amplifying the motion data with a preset gain, converting, by an analog-to-digital converter (ADC), the motion data transmitted from the analog signal processor into a digital value, and restoring, by a digital signal processor, the motion data from the at least one sensing axis on the basis of the digital value transmitted from the ADC, and compensating for a phase delay of the motion data due to the switching timing interval.

The transmitting of the second motion data may include alternately transmitting, by a second analog multiplexer, the motion data from the at least one sensing axis output from the motion sensor at the switching timing interval, and amplifying, by a single analog front end, the motion data regarding each of the at least one sensing axis transmitted from the second analog multiplexer with a preset gain.

Other features and aspects will be apparent from the following detailed description, the drawings, and the claims.

Figure 1:
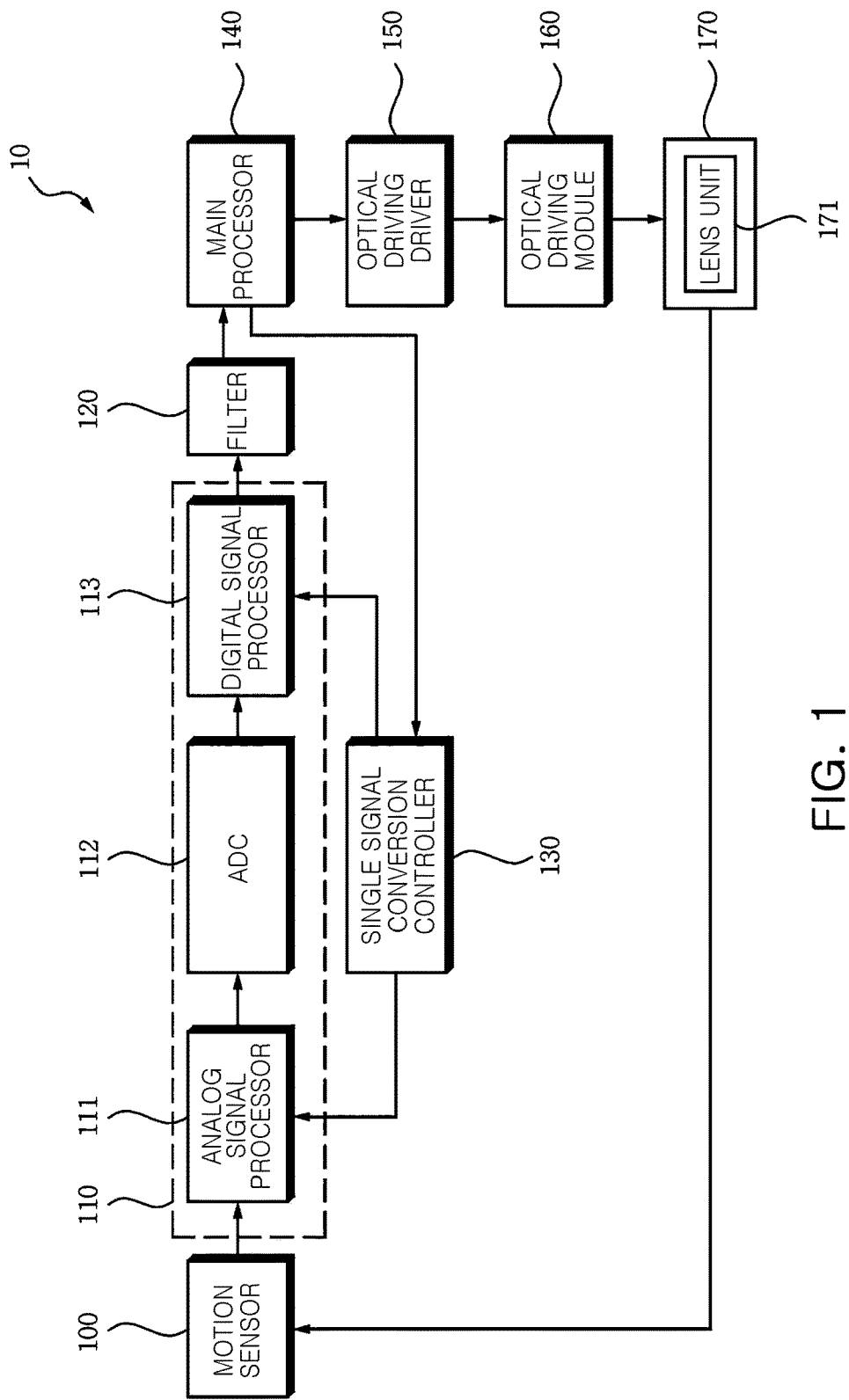
FIG. 1 is a diagram illustrating a digital imaging apparatus according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 2:
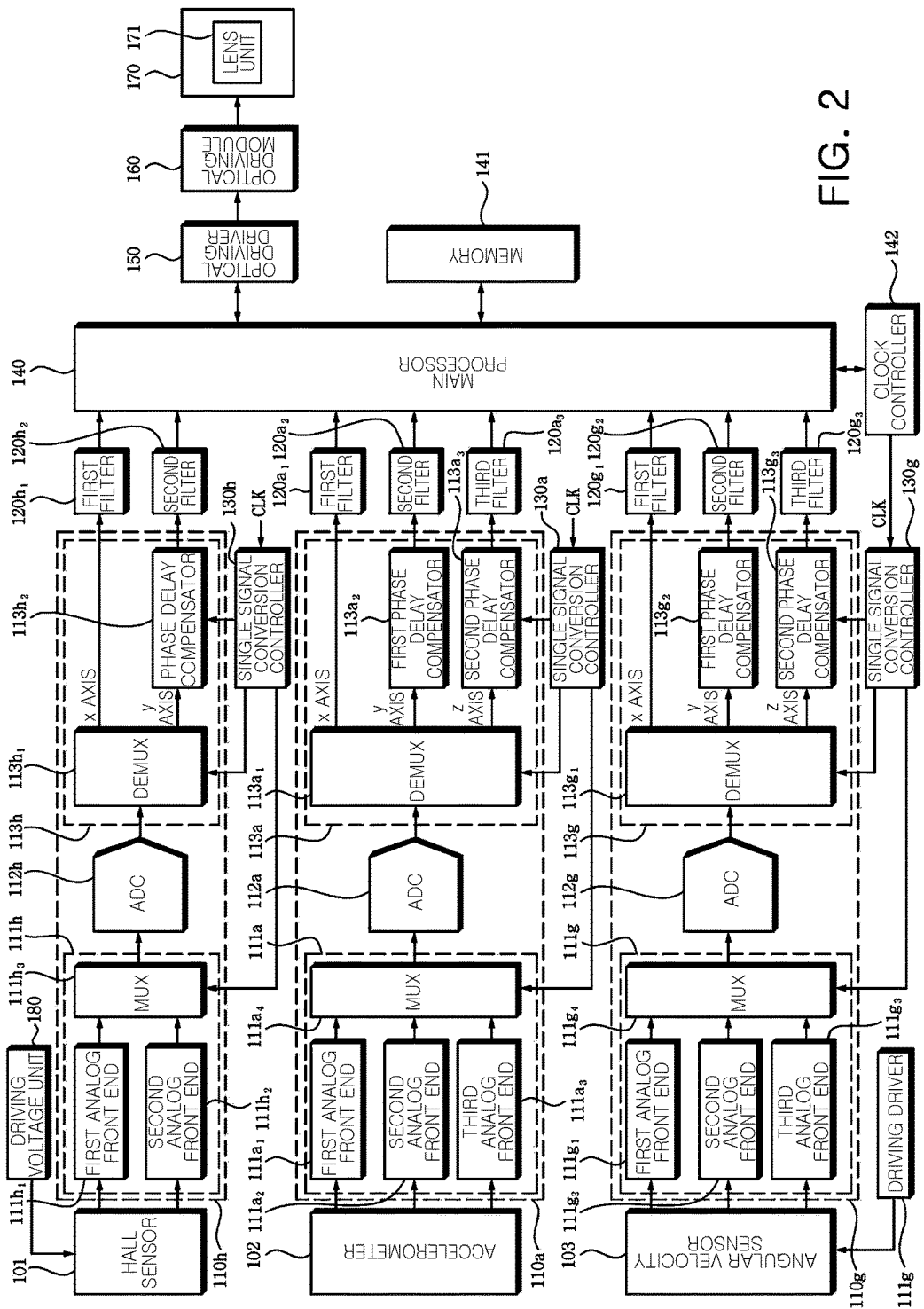
FIG. 2 is a diagram illustrating a circuit configuration of a digital imaging apparatus according to an embodiment.

FIG. 1 is a diagram illustrating a digital imaging apparatus 10 according to an embodiment. FIG. 2 is a diagram illustrating a circuit configuration of a digital imaging apparatus according to an embodiment.

As illustrated in FIGS. 1 and 2, the digital imaging apparatus includes a motion sensor 100, a single signal conversion processor 110, a filter 120, a single signal conversion controller 130, a main processor 140, an optical driving driver 150, an optical driving module 160, and a camera module 170.

As a non-exhaustive illustration only, a digital imaging apparatus described herein may refer to mobile devices such as, for example, a camera, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, or any other consumer electronics/information technology(CE/IT) device, or any other device capable of wireless communication or network communication consistent with that disclosed herein.

The digital imaging apparatus may also be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

The motion sensor 100 may be provided within or outside of the camera module 170, and outputs motion data corresponding to a movement of the camera module 170 from at least one sensing axis (x axis, y axis, or z axis).

As shown in FIG. 2, the motion sensor 100 includes an angular velocity sensor 103 to sense a change in a rotational component (angular velocity) of the camera module 170 due to hand-shake. As shown in FIG. 2, the motion sensor 100 includes an accelerometer 102 to sense a change in a linear component (velocity) due to a movement of the camera module 170 in a vertical or horizontal direction. As shown in FIG. 2, the motion sensor 100 includes a hall sensor 101 to detect a current location of a lens unit 171 using a hall effect in which a voltage is changed according to strength of a magnetic field. The lens unit 171 may include a zoom lens, a focusing lens, or a compensation lens.

The single signal conversion processor 110 compensates for a phase delay of the motion data of the motion sensor 100, which is alternately transmitted or received at a switching time interval $\Delta t$ among the sensing axes (x axis, y axis, or z axis) due to the switching time interval $\Delta t$.

The single signal conversion processor 110 may be separately provided or may be included in one of the hall sensor 101, the accelerometer 102, and the angular velocity sensor 103. In an example, the single signal conversion processor 110 includes an analog signal processor 111, an analog-to-digital converter (ADC) 112, and a digital signal processor 113.

The single signal conversion controller 130 controls a switching timing interval $\Delta t$ of the single signal conversion processor 110 and phase delay compensation of the motion data regarding the sensing axes of the motion sensor 100 according to the switching timing interval $\Delta t$.

The single signal conversion controller 130 calculates a delay timing td for compensating for a phase delay of the motion data regarding another sensing axis according to a switching timing interval $\Delta ts$ in relation to a switching time is of the motion data regarding any one sensing axis (reference sensing axis), and transmits the delay timing td to the single signal conversion processor 110.

The single signal conversion processor 110 delays a phase of the motion data of the motion sensor 100 regarding the another sensing axis by the delay timing td, thereby compensating for the phase delay of the motion data regarding the another sensing axis due to the switching timing interval $\Delta ts$.

The filter 120 may be a filter such as, for example, a low pass filter (LPF), filters noise of the motion data output from the single signal conversion processor 110. The main processor 140 controls the single signal conversion controller 130, the optical driving driver 150, and a clock controller 142 on the basis of the motion data transmitted from the single signal conversion processor 110.

The optical driving driver 150 generates a driving voltage and a control signal of the optical driving module 160 for a movement of the lens unit 171 according to a control signal input from the main processor 140. The optical driving module 160 may include first and second actuators (not shown) including a voice coil motor (VCM) or a piezoelectric device. The first actuator (not shown) controls a movement of the lens unit 171 in a vertical direction (y axis direction) and the second actuator (not shown) controls a movement of the lens unit 171 in a horizontal direction (x axis direction).

Single signal conversion and phase delay compensation process applied to motion data of each of the sensing axes of the motion sensor in the single signal conversion processor 110 is described with reference to FIGS. 3 through 12.

As illustrated in FIG. 2, in the digital imaging apparatus, the single signal conversion processor 110 for performing single signal conversion on motion data corresponding to a movement of the camera module 170 from the motion sensor 100 may be separately provided in each of the sensors, i.e., the hall sensor 101, the accelerometer 102, and the angular velocity sensor 103.

The single signal conversion processor 110 alternately transmits motion data to or receives motion data from the motion sensor 100 at a switching timing interval Δt. The single signal conversion processor 110 compensates for a phase delay due to the switching timing interval Δt of the motion data. In an example, the single signal conversion processor 110 includes a first analog signal processor 111, an analog digital converter 112, and a digital signal processor 113.

The first analog signal processor 111 amplifies motion data regarding at least one sensing axis (x axis, y axis, or z axis) output from the motion sensor 100 with a preset gain, and alternately transmits the motion data regarding each of the sensing axes (x axis, y axis, or z axis) at the switching timing interval Δt.

The first analog signal processor 111 includes one or more analog front ends $111h_1$ to $111h_3$, $111a_1$ to $111a_3$, and $111g_1$ to $111g_3$, which correspond to each of the sensing axes of the motion sensor 100 and amplify motion data regarding the sensing axes with a preset gain. The first analog signal processor 111 also includes first analog multiplexers (MUX) $111h_3$, $111a_4$, and $111g_4$ which alternately transmit the motion data regarding each of the sensing axes output from each of the analog front ends $111h_1$ to $111g_3$ at a switching timing interval Δt.

The ADC 112 converts the motion data transmitted from the first analog signal processor 111 into a digital value having a resolution, such as, for example, 12 bits.

The digital signal processor 113 restores the motion data regarding each of the sensing axes of the motion sensor 100 on the basis of the digital value transmitted from the ADC 112, and compensates for a phase delay of the motion data due to the switching timing interval Δt. The digital signal processor 113 includes demultiplexers (De-mux) $113h_1$ $113a_1$, and $113g_1$ and phase delay compensators $113h_2$ to $113g_3$.

The demultiplexers $113h_1$, $113a_1$, and $113g_1$ restore the motion data regarding each of the sensing axes (x axis, y axis, and z axis) of the motion sensor 100 at the switching timing interval Δt on the basis of the digital value transmitted from the ADC 112. The demultiplexers $113h_1$ $113a_1$, and $113g_1$ are switched at the same switching timing interval Δt as an analog multiplexer to restore the single signal-converted motion data of the motion sensor 100 regarding each of the sensing axes.

The phase delay compensators $113h_2$, $113a_2$, $113a_3$, $113g_2$, and $113g_3$ compensate for a phase delay of the motion data regarding another sensing axis (y axis or z axis) according to the switching timing interval Δt in relation to the switching time is of the motion data of the motion sensor 100 regarding any one sensing axis (x axis).

On the basis of a delay timing td for compensating for a phase delay of the motion data according to the switching timing interval Δt regarding the another sensing axis (y axis or z axis), the phase delay compensators $113h_2$ $113a_2$, $113a_3$, $113g_2$, and $113g_3$ delay the phase of the motion data regarding another sensing axis (y axis or z axis) by the delay timing td.

A single signal conversion and phase delay compensation process applied to motion data of each of the sensors (the hall sensor, the accelerometer, and the angular velocity sensor) of the digital imaging apparatus will be described with reference to FIGS. 3 through 8.

Figure 3:
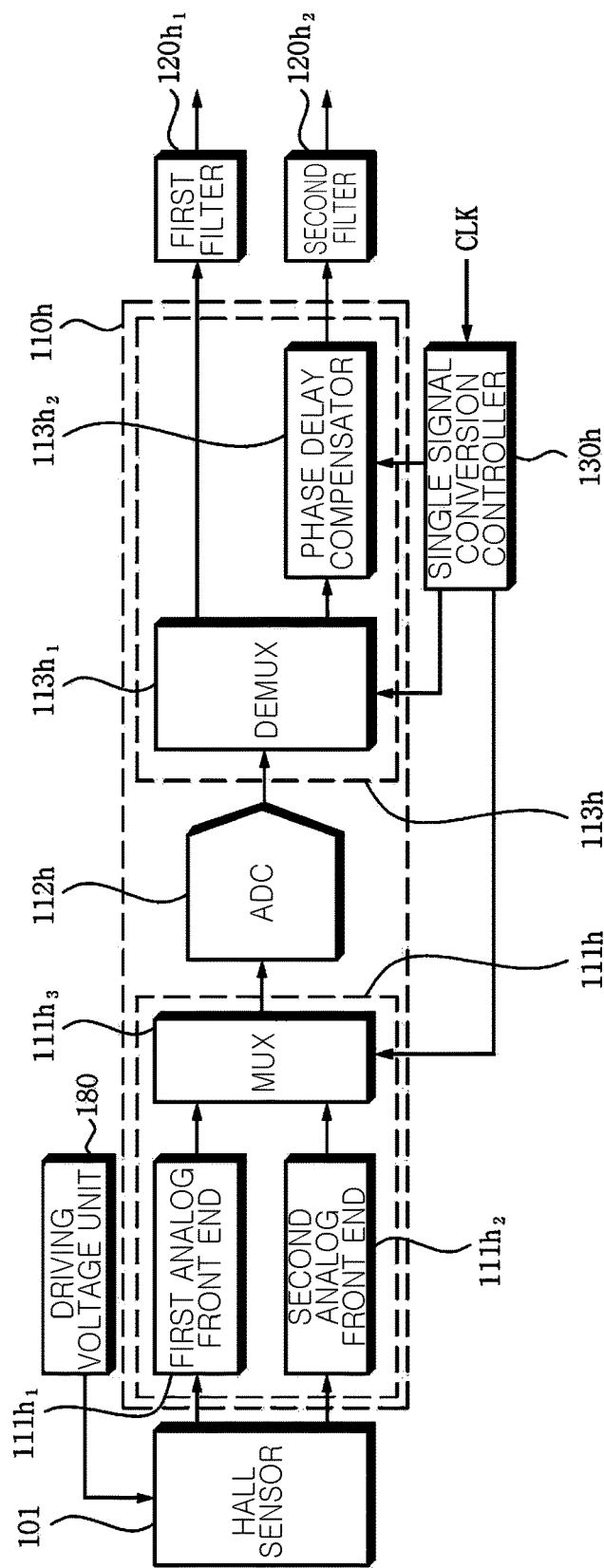
FIG. 3 is a diagram illustrating a single signal conversion process of a hall sensor according to an embodiment.

As illustrated in FIG. 3, the hall sensor 101 is a sensor for sensing a current position of the lens unit 171 using a hall effect in which a voltage is changed according to strength of a magnetic field. The hall sensor 101 senses the motion data sensed on the x sensing axis and the y sensing axis of the hall sensor 101, which are amplified with a preset gain through the first analog front end $111h_1$ and the second analog front end $111h_2$, respectively. The amplified motion data sensed on the x sensing axis and the y sensing axis of the hall sensor 101 are alternately transmitted to the ADC 112 at the switching timing interval Δt through the first analog multiplexer $111h_3$. The switching timing interval Δt of the first analog multiplexer $111h_3$ may be controlled by a select signal transmitted from the single signal conversion controller 130.

Figure 4A:
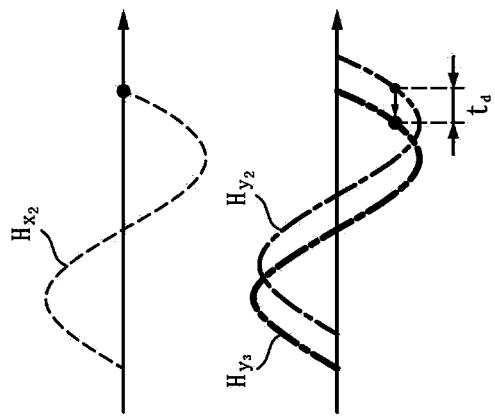
FIGS. 4A through 4C are diagrams illustrating a single signal conversion and phase delay compensation process applied to motion data of each sensing axis of a hall sensor according to an embodiment.

As illustrated in FIG. 4A, the motion data $H_{x1}$ sensed on the x sensing axis of the hall sensor 101, starting from a value when t=$t_1$, and the motion data $H_{y1}$ sensed on the y sensing axis of the hall sensor 101, starting from a value when t=$t_2$ after the switching timing interval Δt, are alternately transmitted through the analog multiplexer at the switching timing interval Δt.

The motion data sensed on the x sensing axis or the y sensing axis of the hall sensor 101, which is transmitted from the first analog multiplexer $111h_3$ is converted into a digital value having a resolution, such as, for example, 12 bits, by the ADC 112h and transmitted to the demultiplexer $113h_1$.

The motion data transmitted from the ADC 112h is alternately restored to motion data of the x sensing axis and the y sensing axis at the switching timing interval Δt through the demultiplexer $113h_1$. The switching timing interval Δt of the demultiplexer $113h_1$ may be controlled by a select signal transmitted from the single signal conversion controller 130.

Figure 4B:
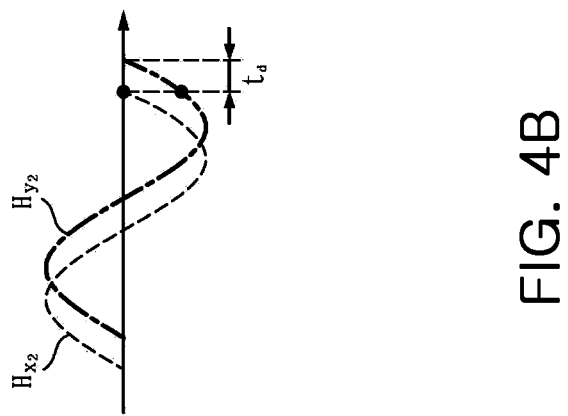

As illustrated in FIG. 4B, the motion data transmitted from the ADC 112h is restored to the motion data $H_{x2}$ on the x sensing axis of the hall sensor 101 and the motion data $H_{y2}$ on the y sensing axis of the hall sensor 101 through the demultiplexer.

Since the motion data $H_{x2}$ sensed on the x sensing axis of the hall sensor 101, starting from a value when t=$t_1$, and the motion data $H_{y2}$ sensed on the y sensing axis of the hall sensor 101, starting from a value when t=$t_2$ after the switching timing interval Δt, are alternately transmitted at the switching timing interval Δt through the analog multiplexer. In this case, a problem may arise where a phase of the motion data from the y sensing axis is delayed by $t_d$, compared with the motion data from the x sensing axis.

The phase of the motion data from the y sensing axis of the hall sensor 101 transmitted from the demultipelxer $113h_1$ is compensated to be equal to the phase of the motion data from the x sensing axis using the delay timing td calculated by the single signal conversion controller 130 through a phase delay compensator $113h_2$.

Figure 4C:
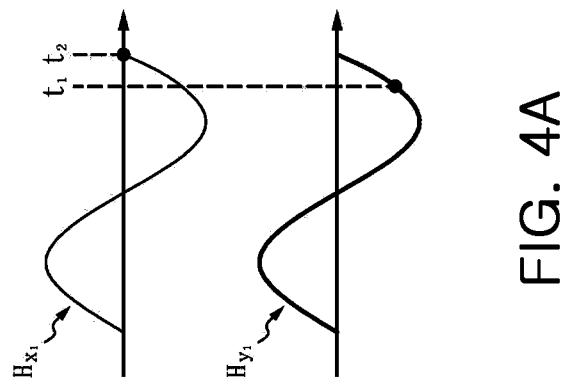

As illustrated in FIG. 4C, the single signal conversion controller 130 compares the phase of the motion data $H_{y2}$ from the y sensing axis in relation to the motion data $H_{x2}$ from the x sensing axis, calculates the delay timing $t_d$ of the motion data from the y sensing axis, and transmits the calculated delay timing $t_d$ to the phase delay compensator $113h_2$.

The phase delay compensator $113h_2$ compensates for the phase of the motion data $H_{Y2}$ from the y sensing axis such that it is equal to the phase of the motion data $H_{X3}$ from the x sensing axis, using the delay timing $t_d$.

Figure 5:
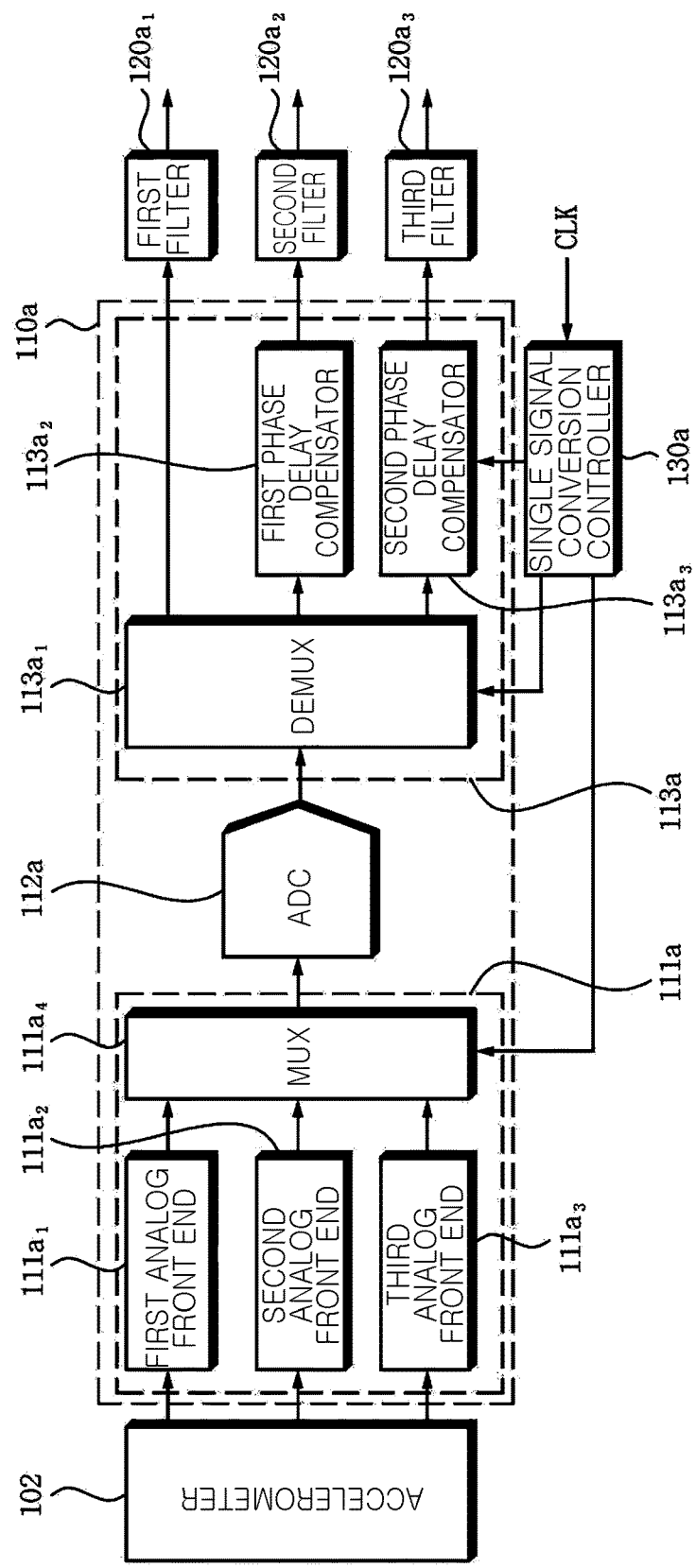
FIG. 5 is a diagram illustrating a single signal conversion process of an accelerometer according to an embodiment.

As illustrated in FIG. 5, the motion data sensed on the x sensing axis, the y sensing axis, and the z sensing axis of the accelerometer 102 is amplified with a preset gain through the first analog front end $111a_1$, the second analog front end $111a_2$, and the third analog front end $111a_3$, respectively.

The amplified motion data is alternately transmitted to the ADC 112a at the switching timing interval Δt through the first analog multiplexer $111a_4$. The switching timing interval Δt of the first analog multiplexer $111a_4$ may be controlled by a select signal transmitted from the single signal conversion controller 130.

Figure 6C:
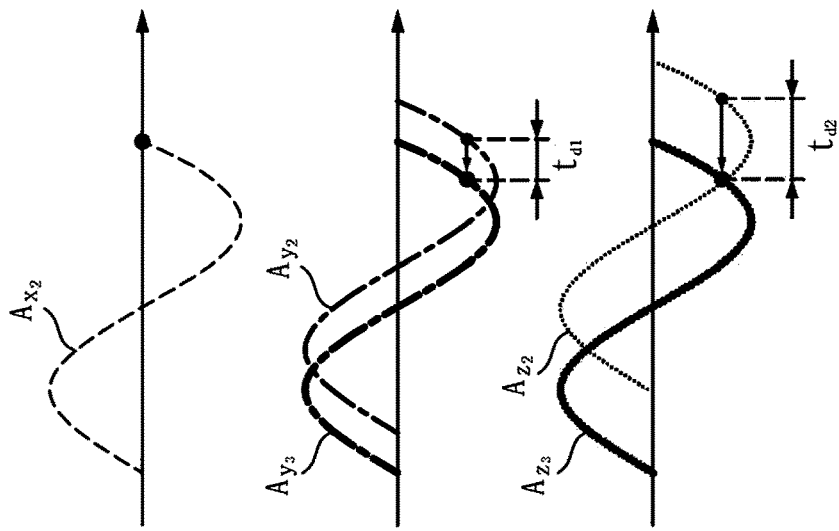
FIGS. 6A through 6C are diagrams illustrating a single signal conversion and phase delay compensation process applied to motion data of each sensing axis of an accelerometer according to an embodiment.
Figure 6B:
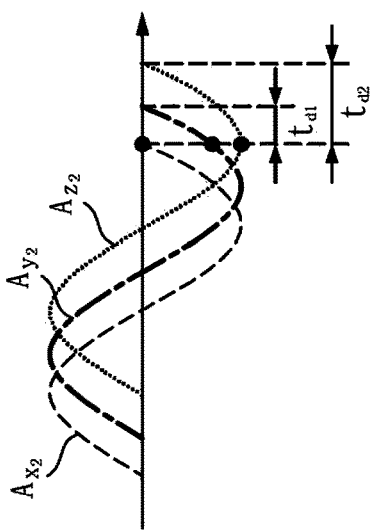
Figure 6A:
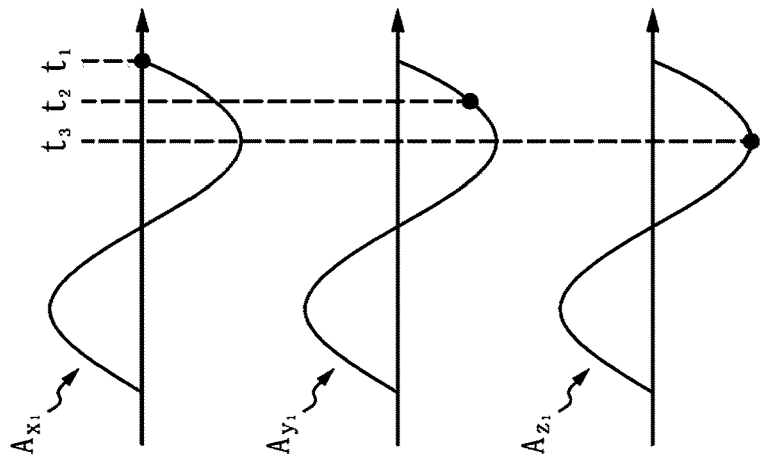

As illustrated in FIG. 6A, the motion data $A_{X1}$ sensed on the x sensing axis of the accelerometer 102, starting from a value when $t=t_1$, the motion data $A_{Y1}$ sensed on the y sensing axis of the accelerometer 102, starting from a value when $t=t_2$ after the switching timing interval Δt, and the motion data $A_{Z1}$ sensed on the z sensing axis of the accelerometer 102, starting from a value when $t=t_3$ after the switching timing interval Δt, are periodically transmitted through the first analog multiplexer $111a_1$ mutually at the switching timing interval Δt.

The motion data sensed on the x sensing axis, the y sensing axis, or the z sensing axis of the accelerometer 102 transmitted from the first analog multiplexer $111a_4$ is converted into a digital value having a resolution, such as, for example, 12 bits, by the ADC 112a and transmitted to the demultiplexer $113a_1$.

The motion data transmitted from the ADC 112a is periodically restored to motion data of the x sensing axis, the y sensing axis, and the z sensing axis at the switching timing interval Δt through the demultiplexer $113a_1$. The switching timing interval Δt of the demultiplexer $113a_1$ may be controlled by a select signal transmitted from the single signal conversion controller 130.

As illustrated in FIG. 6B, the motion data transmitted from the ADC 112a is restored to the motion data $A_{X2}$ on the x sensing axis of the accelerometer 102, the motion data $A_{Y2}$ on the y sensing axis of the accelerometer 102, and the motion data $A_{Z2}$ on the z sensing axis of the accelerometer 102 through the demultiplexer.

The motion data $A_{X2}$ is sensed on the x sensing axis of the accelerometer 102, starting from a value when $t=t_1$, the motion data $A_{Y2}$ is sensed on the y sensing axis of the accelerometer 102, starting from a value when $t=t_2$ after the switching timing interval Δt, and the motion data $A_{Z2}$ is sensed on the z sensing axis of the accelerometer 102, starting from a value when $t=t_3$ after the switching timing interval Δt. These three motion data $A_{X2}$, $A_{Y2}$, and $A_{Z2}$ are mutually alternately transmitted at the switching timing interval Δt through the first analog multiplexer $111a_4$, a phase of the motion data from the y sensing axis is delayed by $t_d$, compared with the motion data from the x sensing axis, and a phase of the motion data from the z sensing axis is delayed by $2t_d$, compared with the motion data from the x sensing axis arises.

Thus, the phase of the motion data from the y sensing axis of the accelerometer 102 transmitted from the demultipelxer $113a_1$ is compensated to be equal to the phase of the motion data from the x sensing axis by using the first delay timing $t_d$ calculated by the single signal conversion controller 130 through a first phase delay compensator $113a_2$. The phase of the motion data from the z sensing axis of the accelerometer 102 transmitted from the demultipelxer $113a_1$ is compensated to be equal to the phase of the motion data from the x sensing axis by using the second delay timing $2t_d$ calculated by the single signal conversion controller 130 through a second phase delay compensator $113a_3$.

As illustrated in FIG. 6C, the single signal conversion controller 130 compares the phase of the motion data $A_{Y2}$ from the y sensing axis and the phase of the motion data $A_{Z2}$ from the z sensing axis in relation to the motion data $A_{X2}$ from the x sensing axis. The single signal conversion controller 130 calculates the delay timings $t_d$ and $2t_d$ of the motion data from the y sensing axis and the z sensing axis, and transmits the calculated delay timings $t_d$ and $2t_d$ to the first phase delay compensator $113a_2$ and the second phase delay compensator $113a_3$.

The first phase delay compensator $113a_2$ compensates for the phase of the motion data $A_{Y2}$ from the y sensing axis such that it is equal ($A_{Y3}$) to the phase of the motion data $A_{X2}$ from the x sensing axis using the first delay timing $t_d$.

The second phase delay compensator $113a_3$ compensates for the phase of the motion data $A_{Z2}$ from the z sensing axis such that it is equal ($A_{Z3}$) to the phase of the motion data $A_{X2}$ from the x sensing axis, by using the second delay timing $2t_d$.

Figure 7:
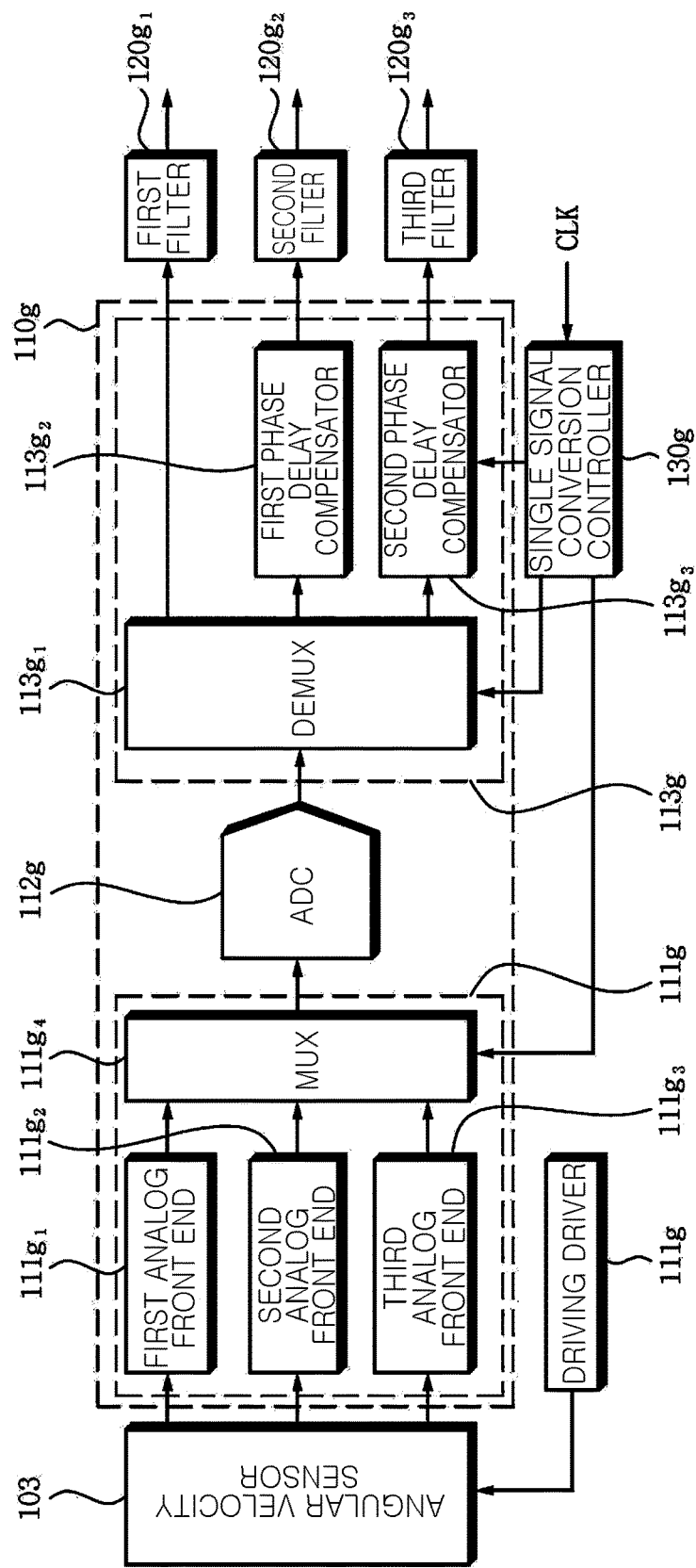
FIG. 7 is a diagram illustrating a single signal conversion process of an angular velocity sensor according to an embodiment.

As illustrated in FIG. 7, the motion data sensed on the x sensing axis, the y sensing axis, and the z sensing axis of the angular velocity sensor 103 are amplified with a preset gain through the first analog front end $111g_1$, the second analog front end $111g_2$, and the third analog front end $111g_3$, respectively.

The amplified motion data is periodically transmitted to the ADC 112g at the switching timing interval Δt through the first analog multiplexer $111g_4$. The switching timing interval Δt of the first analog multiplexer $111g_4$ may be controlled by a select signal transmitted from the single signal conversion controller 130.

Figure 8C:
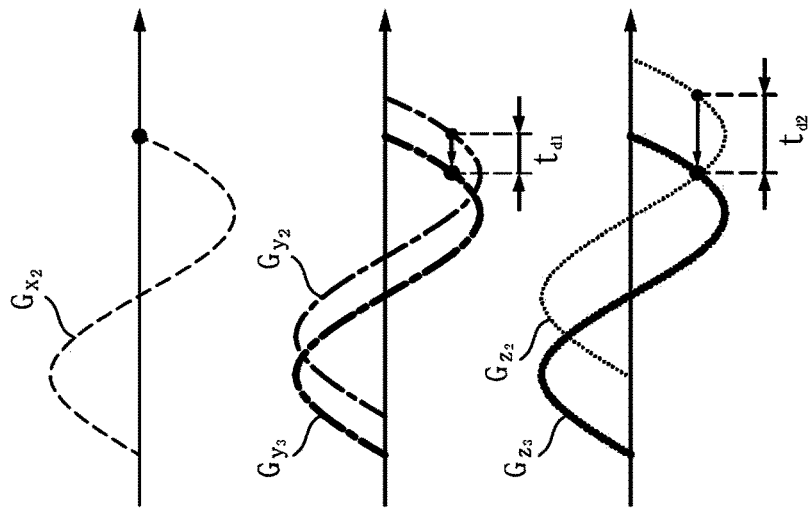
FIGS. 8A through 8C are diagrams illustrating a single signal conversion and phase delay compensation process applied to motion data of each sensing axis of an angular velocity sensor according to an embodiment.
Figure 8B:
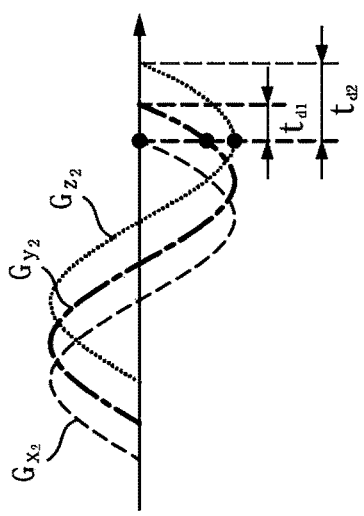
Figure 8A:
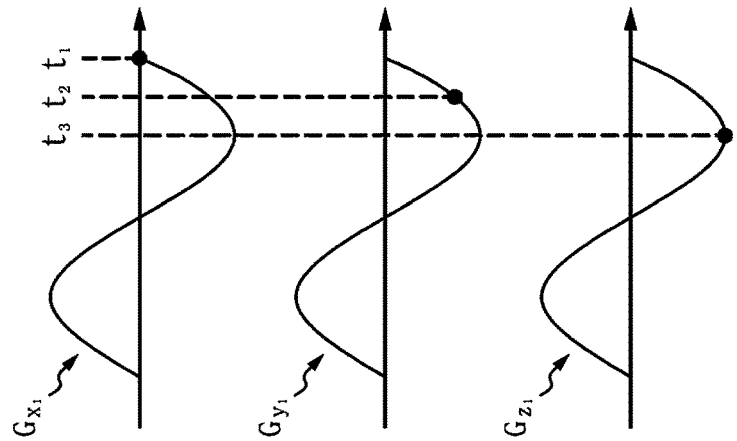

As illustrated in FIG. 8A, the motion data $G_{X1}$ sensed on the x sensing axis of the angular velocity sensor 103, starting from a value when $t=t_1$, the motion data $G_{Y1}$ sensed on the y sensing axis of the angular velocity sensor 103, starting from a value when $t=t_2$ after the switching timing interval Δt, and the motion data $G_{Z1}$ sensed on the z sensing axis of the angular velocity sensor 103, starting from a value when $t=t_3$ after the switching timing interval Δt, are periodically transmitted through the analog multiplexer $111g_4$ mutually at the switching timing interval Δt.

The motion data sensed on the x sensing axis, the y sensing axis, or the z sensing axis of the angular velocity sensor 103 transmitted from the analog multiplexer is converted into a digital value having a resolution, such as, for example, 12 bits, by the ADC 112g and transmitted to the demultiplexer $113g_1$.

The motion data transmitted from the ADC 112g is periodically restored to motion data of the x sensing axis, the y sensing axis, and the z sensing axis at the switching timing interval Δt through the demultiplexer $113g_1$. The switching timing interval Δt of the demultiplexer $113g_1$ may be controlled by a select signal transmitted from the single signal conversion controller 130.

As illustrated in FIG. 7B, the motion data transmitted from the ADC 112g is restored to the motion data $G_{X2}$ on the x sensing axis of the angular velocity sensor 103, the motion data $G_{Y2}$ on the y sensing axis of the angular velocity sensor 103, and the motion data $G_{Z2}$ on the z sensing axis of the angular velocity sensor 103 through the demultiplexer $113g_1$.

The motion data $G_{X2}$ is sensed on the x sensing axis of the angular velocity sensor 103, starting from a value when $t=t_1$, the motion data $G_{Y2}$ is sensed on the y sensing axis of the angular velocity sensor 103, starting from a value when $t=t_2$ after the switching timing interval $\Delta t$, and the motion data $G_{Z2}$ is sensed on the z sensing axis of the angular velocity sensor 103, starting from a value when $t=t_3$ after the switching timing interval $\Delta t$. These three motion data $G_{X2}$, $G_{Y2}$, and $G_{Z2}$ are alternately transmitted mutually at the switching timing interval $\Delta t$ through the analog multiplexer, a phase of the motion data from the y sensing axis is delayed by $t_d$, compared with the motion data from the x sensing axis, and a phase of the motion data from the z sensing axis is delayed by $2t_d$, compared with the motion data from the x sensing axis arises.

Thus, the phase of the motion data from the y sensing axis of the angular velocity sensor 103 transmitted from the demultipelxer $113g_1$ is compensated to be equal to the phase of the motion data from the x sensing axis by using the first delay timing $t_d$ calculated by the single signal conversion controller 130 through a first phase delay compensator $113g_2$. The phase of the motion data from the z sensing axis of the angular velocity sensor 103 transmitted from the demultipelxer $113g_1$ is compensated to be equal to the phase of the motion data from the x sensing axis by using the second delay timing $2t_d$ calculated by the single signal conversion controller 130 through a second phase delay compensator $113g_3$.

As illustrated in FIG. 8C, the single signal conversion controller 130 compares the phase of the motion data $G_{Y2}$ from the y sensing axis and the phase of the motion data $G_{Z2}$ from the z sensing axis in relation to the motion data $G_{X2}$ from the x sensing axis. The single signal conversion controller 130 calculates the delay timings $t_d$ and $2t_d$ of the motion data from the y sensing axis and the z sensing axis, and transmits the calculated delay timings $t_d$ and $2t_d$ to the first phase delay compensator $113g_2$ and the second phase delay compensator $113g_3$, respectively.

The first phase delay compensator $113g_2$ compensates for the phase of the motion data $G_{Y2}$ from the y sensing axis such that it is equal ($G_{Y3}$) to the phase of the motion data $G_{X2}$ from the x sensing axis, by using the first delay timing $t_d$.

The second phase delay compensator $113g_3$ compensates for the phase of the motion data $G_{Z2}$ from the z sensing axis such that it is equal ($G_{Z3}$) to the phase of the motion data $G_{X2}$ from the x sensing axis, by using the second delay timing $2t_d$.

Hereinafter, single signal conversion and phase delay compensation process applied to motion data of each of the sensors (the hall sensor, the accelerometer, and the angular velocity sensor) of the digital imaging apparatus will be described in detail with reference to FIGS. 9 through 12.

Figure 9:
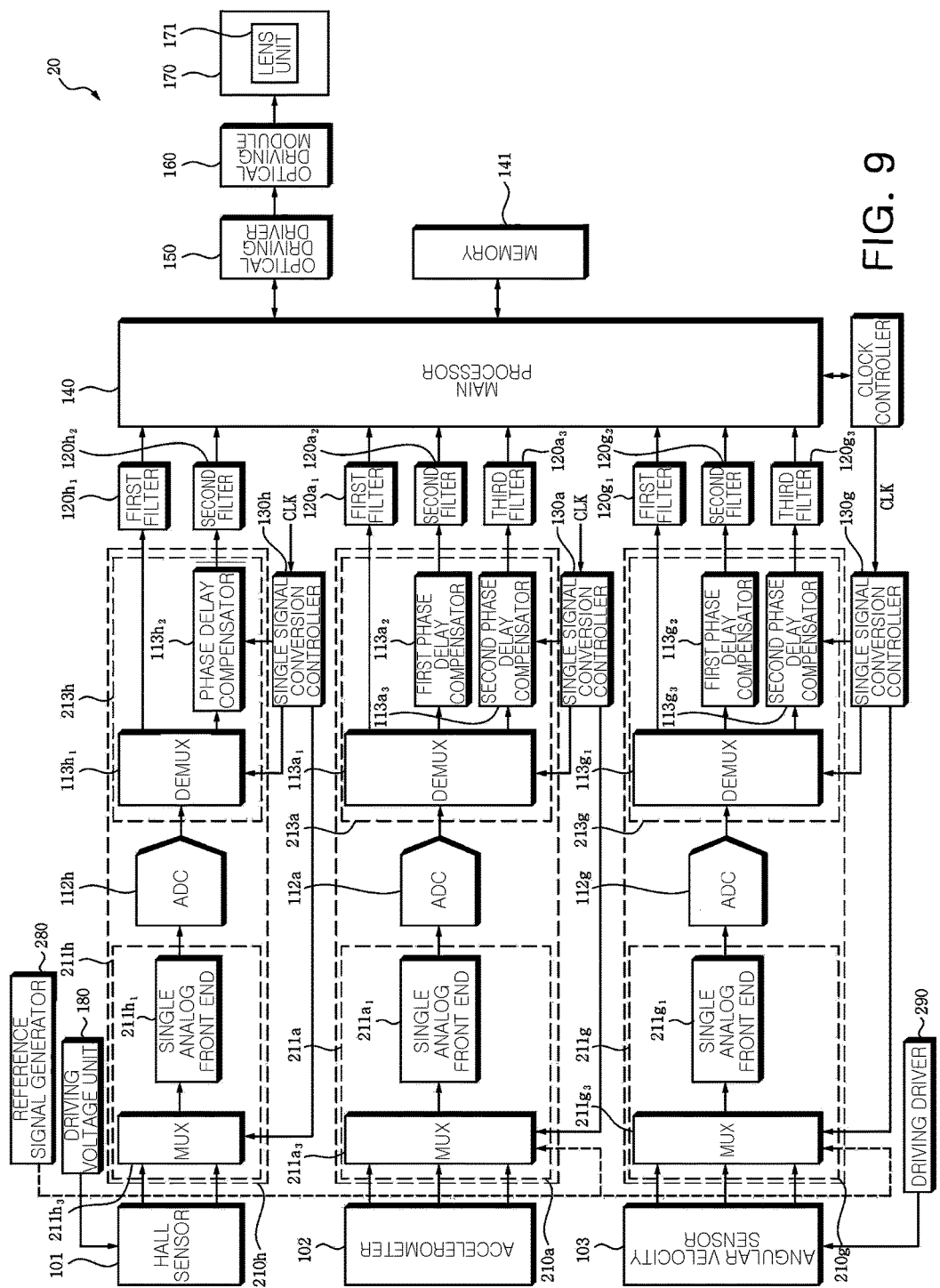
FIG. 9 is a diagram illustrating a circuit configuration of a digital imaging apparatus according to another embodiment.

As illustrated in FIG. 9, in the digital imaging apparatus 20 according to another embodiment, the single signal conversion processor 110 for performing single signal conversion on motion data corresponding to a movement of the camera module 170 from the motion sensor 100 may be separately provided in each of the sensors (the hall sensor 101, the accelerometer 102, and the angular velocity sensor 103) of the in the digital imaging apparatus 20. Some of the components FIGS. 9 through 12 are described in FIGS. 1-8 above. The above description of FIGS. 1-8, is also applicable to FIGS. 9 through 12, and is incorporated herein by reference. Thus, the above description may not be repeated here.

The single signal conversion processors 210a, 210h, and 210g provides motion data to or receives motion data from the motion sensor at a switching timing interval $\Delta t$, and compensates for a phase delay due to the switching timing interval $\Delta t$ of the motion data. As shown in FIG. 9, the single signal conversion processor 210a, 210h, and 210g, each include a second analog signal processor, an analog digital converter, and a digital signal processor.

Components, excluding the second analog signal processor, of the digital imaging apparatus 20 perform similar functions as those of the previous embodiment described above. The above description is incorporated herein by reference, and the above description may not be repeated here.

Motion data regarding each of the sensing axes is alternately input to second analog signal processors 211h, 211a, and 211g at a switching timing interval. The second analog signal processors 211h, 211a, and 211g amplify the motion data with a preset gain. The second analog signal processors 211h, 211a, and 211g include second analog multiplexers $211h_3$, $211a_3$, and $211g_3$ and single analog front ends $211h_1$, $211a_1$, and $211g_1$.

The second analog multiplexers $211h_3$, $211a_3$, and $211g_3$ transmit motion data regarding each of the sensing axes output from the motion sensor periodically input at the timing interval $\Delta t$, to the single analog front ends $211h_1$, $211a_1$, and $211g_1$.

The single analog front ends $211h_1$, $211a_1$, and $211g_1$ amplify the motion data regarding each of the sensing axes transmitted from the second analog multiplexers $211h_3$, $211a_3$, and $211g_3$ with a preset gain and transmit the amplified motion data to the ADC 112h, 112a, and 112g. The process after the ADC 112h, 112a, and 112g is the same as that described with respect to the previous embodiment, and thus, a description thereof will be omitted.

A reference signal generator 280 generates a reference signal having the same phase and inputs the generated reference signal to the single signal conversion processors 210a, 210h, and 210g of the hall sensor 101, the accelerometer 102, and the angular velocity sensor 103, respectively. The generated reference signal detects a degree of generation of a phase delay of the reference signal due to the single signal conversion. Data regarding the detected phase delay is stored in the single signal conversion controller $130_h$, $130_a$, and $130_g$ and reflected when a delay timing $t_d$ is calculated, whereby a phase delay regarding the motion data of each sensor may be accurately compensated.

A single signal conversion and phase delay compensation process applied to output data of each sensor (the hall sensor, the accelerometer, and the angular velocity sensor) of the digital imaging apparatus according to another embodiment will be described with reference to FIGS. 10 through 12. A description of the same part as that of the previous exemplary embodiment described above will be omitted.

Figure 10:
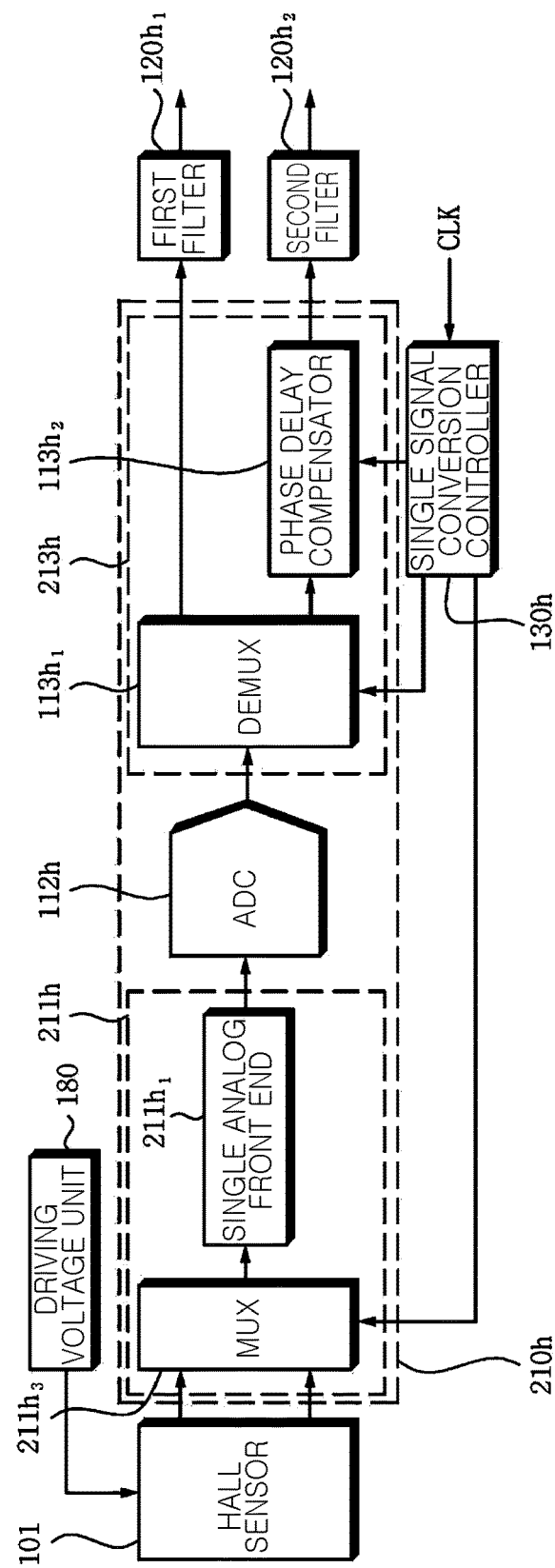
FIG. 10 is a diagram illustrating a single signal conversion and phase delay compensation process applied to motion data of each sensing axis of a hall sensor according to another embodiment.

As illustrated in FIG. 10, motion data sensed on the x sensing axis and the y sensing axis of the hall sensor 101 is alternately input at the switching timing interval $\Delta t$. amplified with a preset gain through the single analog front end $211h_1$, and transmitted to the ADC 112.

The switching timing interval $\Delta t$ of the second analog multiplexer $211h_3$ may be controlled by a select signal transmitted from the single signal conversion controller 130h. Since the single signal conversion process at the digital signal processor 213h is the same as that described above, and thus, a description thereof will be omitted.

Figure 11:
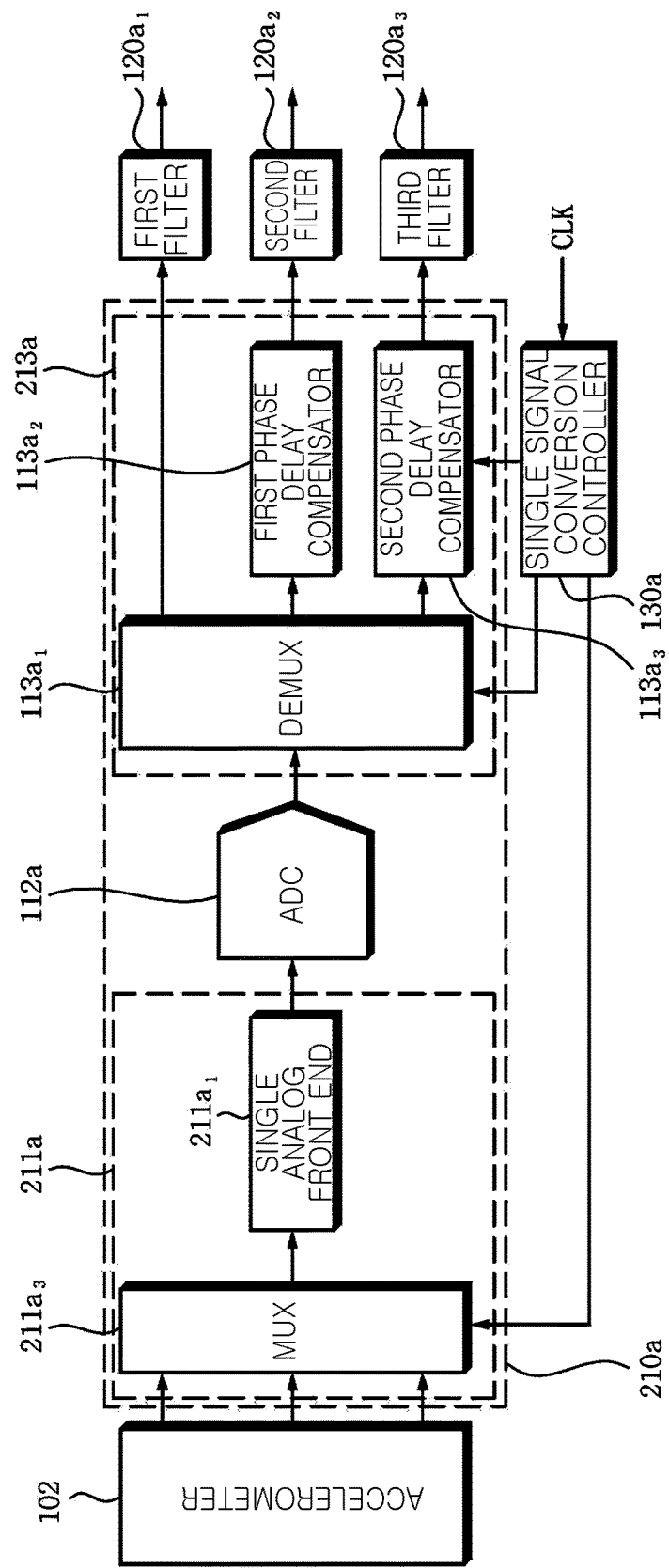
FIG. 11 is a diagram illustrating a single signal conversion and phase delay compensation process applied to motion data of each sensing axis of an accelerometer according to another embodiment.

As illustrated in FIG. 11, motion data sensed on the x sensing axis, the y sensing axis, and the z sensing axis of the accelerometer 102 are periodically input at the switching timing interval $\Delta t$, amplified with a preset gain through the single analog front end $211a_1$, and transmitted to the ADC 112.

The switching timing interval Δt of the second analog multiplexer $211a_3$ may be controlled by a select signal transmitted from the single signal conversion controller 130a. Since the single signal conversion process at the digital signal processor 213a is the same as that described above, and thus, a description thereof will be omitted.

Figure 12:
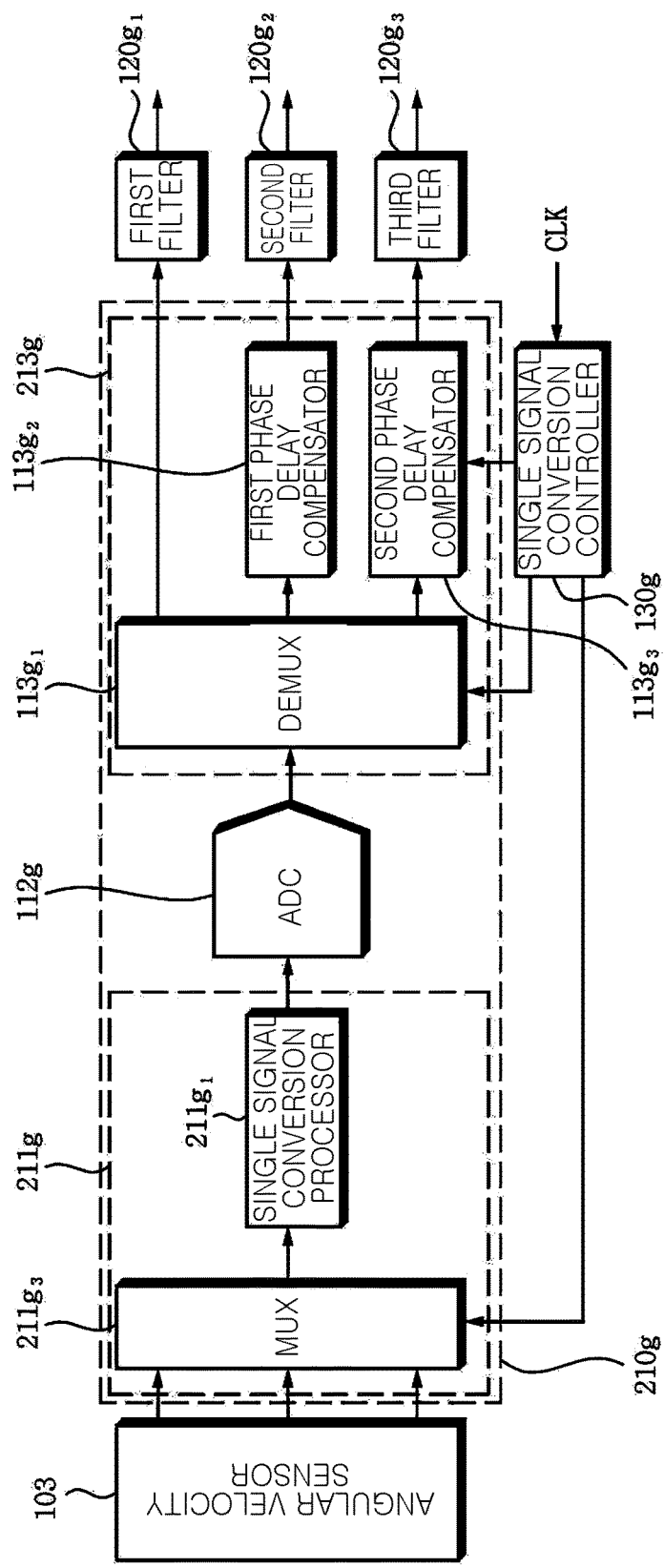
FIG. 12 is a diagram illustrating a single signal conversion and phase delay compensation process applied to motion data of each sensing axis of an angular velocity sensor according to another embodiment.

As illustrated in FIG. 12, motion data sensed on the x sensing axis, the y sensing axis, and the z sensing axis of the angular velocity sensor 103 are alternately input at the switching timing interval Δt, amplified with a preset gain through the single analog front end $211g_1$, and transmitted to the ADC 112.

The switching timing interval Δt of the second analog multiplexer $211g_3$ may be controlled by a select signal transmitted from the single signal conversion controller 130g. Since the single signal conversion process at the digital signal processor 213g is the same as that described above, and thus, a description thereof will be omitted.

The single signal conversion controller 130, the main processor 140, the single signal conversion processor 110, the first analog signal processor 111, the digital signal processor 113, the second analog signal processor 111, and the phase delay compensator described above may include an algorithm for performing the functions described above, and may be realized in hardware (for example, a semiconductor chip or an application-specific integrated circuit (ASIC)).

As set forth above, since the digital imaging apparatus integrally processes motion data output from at least one sensing axis of the motion sensor through a single signal conversion process, an overall size may be reduced.

In addition, since a phase delay between the motion data of each of the sensing axes of the motion sensor that may be caused due to the single signal conversion process is corrected through the phase delay compensator, accuracy may be increased for the digital imaging apparatus.

In one general aspect there is provided a digital imaging apparatus, in which when camera movement occurs in the process of capturing an image of a subject, motion data regarding each sensing axis of a motion sensor with respect to the movement is integrally processed in a single signal conversion process, and a control method thereof.

The digital imaging apparatus and a control method according to embodiments integrally processes motion data output from at least one sensing axis of the motion sensor through a single signal conversion process, and thus, an overall size of the apparatus may be reduced.

In addition, a phase delay between the motion data of each of the sensing axes of the motion sensor that may be caused due to the single signal conversion process being corrected through the phase delay compensator, and thus, accuracy may be secured in the digital imaging apparatus.

The apparatuses, units, modules, devices, and other components illustrated that perform the operations described herein with respect to FIGS. 1-3, 5, 7, and 9-12 are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The methods illustrated in the FIGS. that perform the operations described herein with respect to FIGS. 1-3, 5, 7, and 9-12 are performed by a processor or a computer as described above executing instructions or software to perform the operations described herein.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A digital imaging apparatus comprising:
   a motion sensor configured to output motion data corresponding to a movement of a camera module from two or more sensing axes;
   a single signal conversion processor configured to transmit or receive the motion data at a switching timing interval, and to compensate for a phase delay due to the switching timing interval of the motion data; and
   a single signal conversion controller configured to control phase delay compensation regarding the motion data of the two or more sensing axes according to the switching timing interval of the single signal conversion processor,
   wherein the switching timing interval comprises a time interval between motion data for each of the two or more sensing axes.

2. The digital imaging apparatus of claim 1, wherein:
   the single signal conversion controller is further configured to:
      calculate a delay timing to compensate for a phase delay due to the switching timing interval of motion data regarding another sensing axis in relation to a switching time of the motion data regarding the two or more sensing axes, and
      transmit the calculated delay timing to the single signal conversion processor; and
   the single signal conversion processor is further configured to compensate for a phase of the motion data regarding the another sensing axis such that the phase is equal to that of the motion data regarding the two or more sensing axes on the basis of the delay timing.

3. The digital imaging apparatus of claim 1, wherein the single signal conversion processor comprises:
   a first analog signal processor configured to amplify the motion data regarding the two or more sensing axes with a preset gain, and to periodically transmit the motion data regarding each of the two or more sensing axes at the switching timing interval;
   an analog-to-digital converter (ADC) configured to convert the motion data transmitted from the first analog signal processor into a digital value; and
   a digital signal processor configured to restore the motion data regarding each of the sensing axes on the basis of the digital value transmitted from the ADC, and to compensate for the phase delay due to the switching timing interval of the motion data.

4. The digital imaging apparatus of claim 3, wherein the first analog signal processor comprises:
   at least one analog front end corresponding to the two or more sensing axes and the at least one analog front end being configured to amplify the motion data from the two or more sensing axes with a preset gain; and
   a first analog multiplexer configured to periodically transmit the motion data regarding the two or more sensing axes output from the corresponding at least one analog front end at the switching timing interval.

5. The digital imaging apparatus of claim 3, wherein the digital signal processor comprises:
   a demultiplexer configured to restore the motion data regarding each of the two or more sensing axes at the switching timing interval on the basis of the digital value transmitted from the ADC; and
   at least one phase delay compensator configured to compensate for a phase delay due to the switching timing interval of the motion data regarding the another sensing axis in relation to the switching time of the motion data regarding the two or more sensing axes, the at least one phase delay compensator corresponding to the another sensing axis.

6. The digital imaging apparatus of claim 4, further comprising:
   a phase delay compensator configured to compensate for a phase of motion data regarding another sensing axis such that it is equal to a phase of motion data regarding the two or more sensing axes on the basis of a delay timing transmitted from the single signal conversion controller.

7. The digital imaging apparatus of claim 2, wherein the single signal conversion processor comprises:
   a second analog signal processor configured to receive the motion data regarding each of the two or more sensing axes at the switching timing interval, and to amplify the motion data with a preset gain;
   an analog-to-digital converter (ADC) configured to convert the motion data transmitted from the analog signal processor into a digital value; and
   a digital signal processor configured to restore the motion data regarding each of the two or more sensing axes on the basis of the digital value transmitted from the ADC, and to compensate for the phase delay due to the switching timing interval of the motion data.

8. The digital imaging apparatus of claim 7, wherein the second analog signal processor comprises:
   a second analog multiplexer to which the motion data regarding each of the two or more sensing axes output from the motion sensor is alternately input at the switching interval; and
   a single analog front end amplifying the motion data regarding each of the two or more sensing axes transmitted from the second analog multiplexer with a preset gain.

9. The digital imaging apparatus of claim 8, further comprising a reference signal generator configured to generate a reference signal having the same phase and applying the reference signal to the single signal conversion processor.

10. The digital imaging apparatus of claim 8, further comprising a filter configured to filter noise of the motion data output from the single signal conversion processor.

11. The digital imaging apparatus of claim 8, wherein a number of the analog front end corresponds to a number of sensing axis for the motion data output from the motion sensor.

12. A method for controlling a digital imaging apparatus, the method comprising:
- outputting, by a motion sensor, motion data corresponding to a movement of a camera module from two or more sensing axes;
- compensating for, with a single signal conversion processor, a phase delay due to a time interval of the motion data alternately transmitted or received at a time interval between the two or more sensing axes; and
- controlling, by a single signal conversion controller phase delay compensation of the motion data from the two or more sensing axes according to the switching timing interval of the single signal conversion processor,
- wherein the switching timing interval comprises a time interval between motion data for each of the two or more sensing axes.

13. The method of claim 12, wherein the controlling of the switching timing interval comprises:
- calculating, by the single signal conversion controller, a delay timing for compensating for a phase delay according to the switching timing interval of motion data regarding another sensing axis in relation to a switching time of the motion data regarding the two or more sensing axes;
- transmitting the delay timing to the single signal conversion processor; and
- compensating, at the single signal conversion processor, for a phase of motion data regarding the another sensing axis such that the phase is equal to a phase of motion data regarding the two or more sensing axes on the basis of the delay timing.

14. The method of claim 12, wherein the compensating for the phase delay comprises:
- amplifying, by a first analog signal processor, the motion data from the two or more sensing axes with a preset gain and periodically transmitting the motion data from the two or more sensing axes at a switching timing interval;
- converting, by an analog-to-digital converter (ADC), the motion data transmitted from the first analog signal processor into a digital value; and
- restoring, by a digital signal processor, the motion data regarding each of the two or more sensing axes on the basis of the digital value transmitted from the ADC, and compensating for a phase delay of the motion data due to the switching timing interval.

15. The method of claim 14, wherein the amplifying of the motion data comprises:
- amplifying, by an analog front end corresponding to the two or more sensing axes, the motion data from the two or more sensing axes with a preset gain; and
- periodically transmitting, by a first analog multiplexer, the motion data from the two or more sensing axes output from each analog front end at the switching timing interval.

16. The method of claim 14, wherein the restoring of the motion data comprises:
- restoring, by a demultiplexer, the motion data from the two or more sensing axes at the switching timing interval on the basis of the digital value transmitted from the ADC; and
- compensating for, by a phase delay compensator corresponding to the two or more sensing axes, a phase delay of motion data regarding another sensing axis according to the switching timing interval in relation to a switching time of the motion data regarding the two or more sensing axes.

17. The method of claim 12, wherein the compensating for the phase of the motion data comprises:
- transmitting second motion data by alternately receiving, by a second analog signal processor, the motion data from the two or more sensing axes at a switching timing interval and amplifying the motion data with a preset gain;
- converting, by an analog-to-digital converter (ADC), the motion data transmitted from the analog signal processor into a digital value; and
- restoring, by a digital signal processor, the motion data from the two or more sensing axes on the basis of the digital value transmitted from the ADC, and compensating for a phase delay of the motion data due to the switching timing interval.

18. The method of claim 17, wherein the transmitting of the second motion data comprises:
- alternately transmitting, by a second analog multiplexer, the motion data from the two or more sensing axes output from the motion sensor at the switching timing interval; and
- amplifying, by a single analog front end, the motion data regarding each of the two or more sensing axes transmitted from the second analog multiplexer with a preset gain.

* * * * *